United States Patent [19]

Robillard

[11] Patent Number: 5,508,145
[45] Date of Patent: Apr. 16, 1996

[54] INFRARED IMAGING MATERIALS

[75] Inventor: Jean J. Robillard, El Paso, Tex.

[73] Assignee: Board of Regents, The University of Texas System, Austin, Tex.

[21] Appl. No.: 447,265

[22] Filed: May 22, 1995

Related U.S. Application Data

[63] Continuation of Ser. No. 973,026, Nov. 6, 1992, Pat. No. 5,434,032.

[51] Int. Cl.$^6$ .................................................. G03C 1/685
[52] U.S. Cl. ........................ 430/345; 430/495; 430/944; 430/962; 252/586
[58] Field of Search .................................. 430/345, 346, 430/495, 944, 962; 252/586, 587; 250/330, 316.1

[56] References Cited

U.S. PATENT DOCUMENTS

| Re. 33,914 | 5/1992 | Robillard | 250/331 |
| 4,751,387 | 6/1988 | Robillard | 250/331 |
| 5,098,806 | 3/1992 | Robillard | 430/10 |

*Primary Examiner*—Charles L. Bowers, Jr.
*Assistant Examiner*—John A. McPherson
*Attorney, Agent, or Firm*—Arnold, White & Durkee

[57] ABSTRACT

Materials, films, methods, and systems are described which relate to infrared imaging using a polymeric semiconductor compound having an infrared absorption band crosslinked with a spiroypran capable of producing a visible absorption band. These materials, films, methods, and systems are adapted to produce a visible image when exposed to infrared radiation during use.

14 Claims, 12 Drawing Sheets

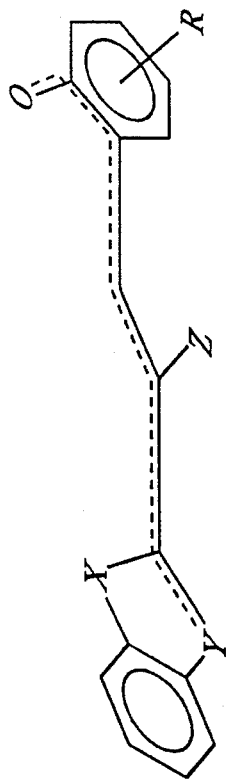
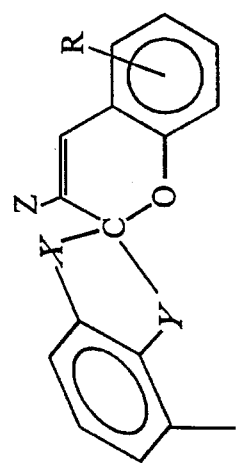
FIG. 5A
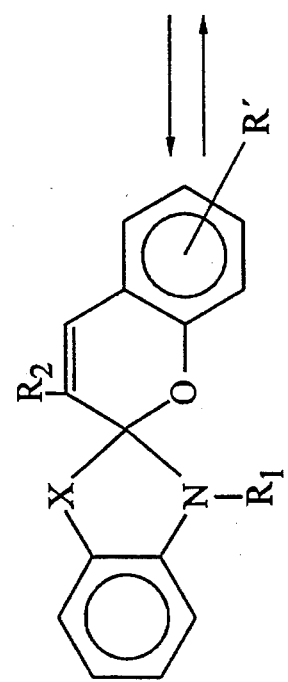
FIG. 5B
FIG. 5C
X = S, X = O, X = Se
$$X = C \begin{matrix} CH_3 \\ CH_3 \end{matrix}$$

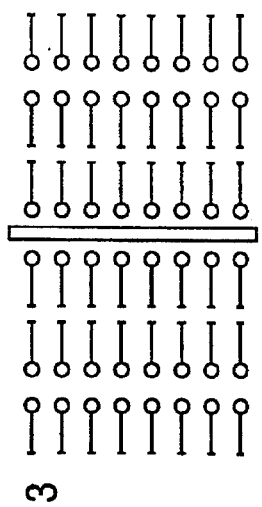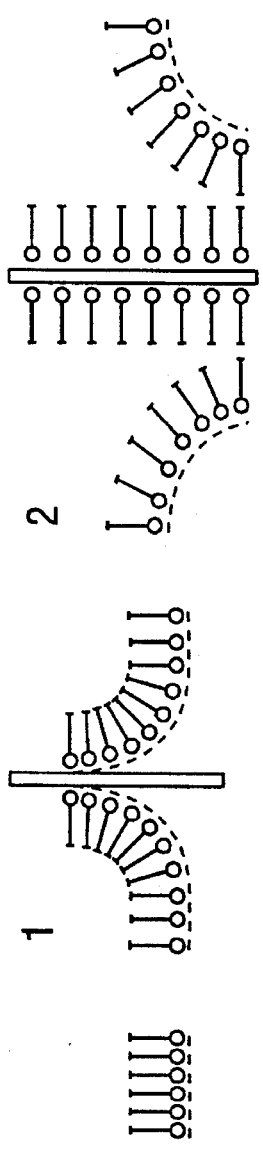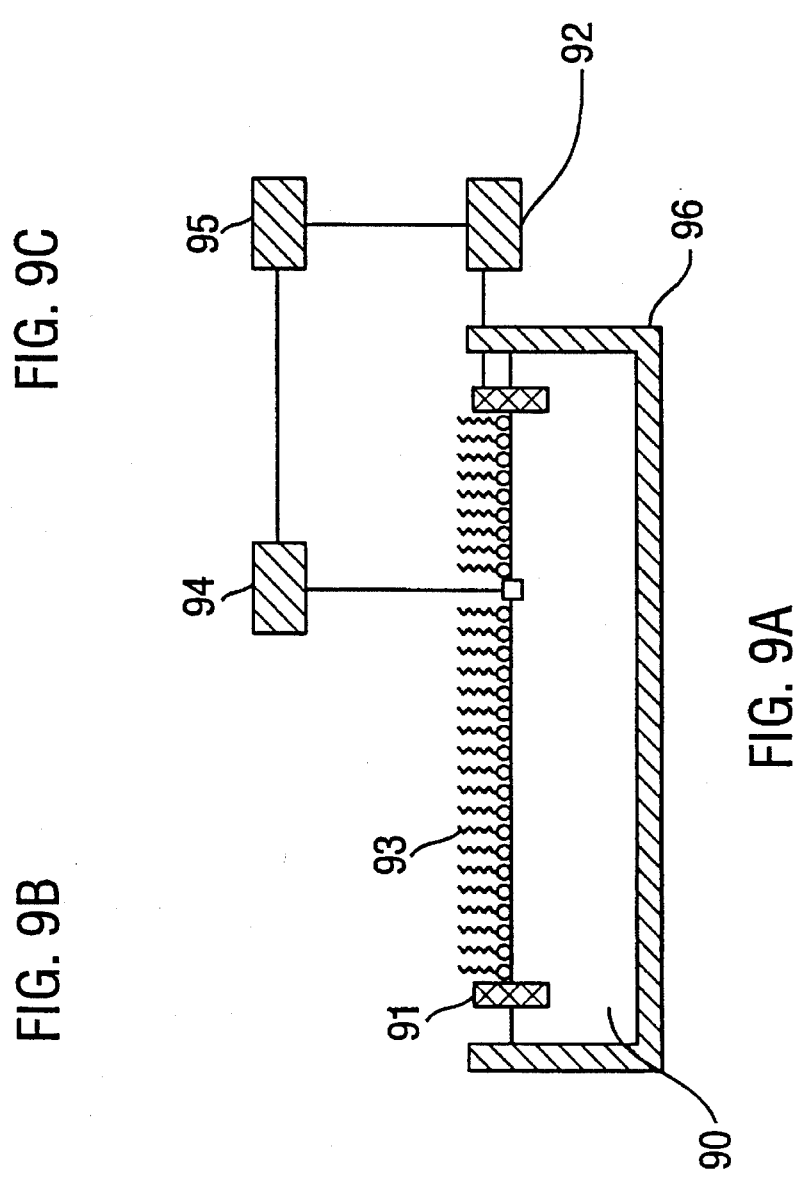
FIG. 9D
FIG. 9C
FIG. 9B
FIG. 9A

INFRARED IMAGING MATERIALS

GOVERNMENT RIGHTS

This invention was made in part with government support. The U.S. government has certain rights to the invention disclosed herein.

This is a continuation of application Ser. No. 07/973,026, filed Nov. 6, 1992, now U.S. Pat. No. 5,434,032.

BACKGROUND OF THE INVENTION

1. Field of the Invention

This invention relates to infrared ("IR") imaging materials, films, methods, and systems, all of which include a polymeric semiconductor compound having an infrared absorption band crosslinked with a spiropyran capable of producing a visible absorption band. The materials, films, methods, and systems of the invention are adapted to produce a visible image when exposed to infrared radiation during use.

2. Description of Related Art

Existing commercial infrared imaging systems can generally be classified into two main categories:

a) Mechanical scanning systems that project sequentially each point of the IR image on a single detector. These systems commonly operate in the 10 microns range, having detectors which are cooled with liquid air or liquid nitrogen.

b) Imaging tubes with an array of detectors, where the elements of the array are scanned with an electron beam. This category of imaging device generally operates in the near infrared, and uses an infrared source to illuminate the object.

Materials such as doped germanium, indium antimonide, or cadmium telluride are typically used for detection in the former case, and germanium or pyroelectric materials in the latter.

Systems as in (a) tend to be complicated, bulky, and expensive, and may require professional maintenance.

Systems as in (b) tend to be more compact and robust. Typically, they have no moving parts, which tends to simplify maintenance. However, their performance is generally limited to the near infrared.

In addition to the above systems, other systems have been described which include a dichroic liquid crystal coated on a membrane in order to detect IR at room temperatures. See U.S. Pat. No. 4,751,387, now Reissue 33,914, the disclosure of which is incorporated herein by reference.

It is believed that this invention may be used to provide a high resolution static infrared camera capable of operating at room temperature. Such a camera would be desirable, especially for airborne and ground operations where volume and weight are important. Mechanical scanning systems generally require frequent maintenance and cooling. Imaging tubes may be more dependable, but generally are not operable in the far infrared range, and are generally limited in resolution by the size of the elements of the array. They also generally use cryogenic systems for cooling. The life time of cryogenic liquids is short and requires replenishment of cooling systems at relatively short intervals.

Accordingly, there is a continuing need to develop improved infrared imaging systems and materials. It is a general object of this invention to provide infrared imaging systems, materials, films, and methods which address at least some of the disadvantages experienced in the art.

SUMMARY OF THE INVENTION

In one broad embodiment, this invention provides an infrared sensitive material which includes a polymeric semiconductor compound having an infrared absorption band. Examples of such polymeric semiconductor compounds may include acetylene polymers such as polydiacetylene. Other polymeric semiconductor compounds may include polythiophenes, polyvinylcarbazoles, or polypyrroles. The polymeric semiconductor compound in the material is crosslinked with a spiropyran capable of producing a visible absorption band, such that the material is adapted to produce a visible image when exposed to infrared radiation during use. Examples of such spiropyrans include indoline, benzothiazoline, oxazine, selenazoline, and benzodinaphtoline.

As stated above, the material of the invention is adapted to produce a visible image when exposed to infrared radiation during use. As such, this material typically includes a conjugated crosslinked structure.

An infrared sensitive material of the invention may preferably include a semiconductor compound that, when exposed to infrared radiation, is adapted to generate and transfer charges to the spiropyran during use, thus producing a ring opening in the spiropyran. As a result, a visible image may be produced due to changes in the absorption (i.e. production of a visible absorption band) and birefringence of the material during use. The production of an image by a change in absorption only is limited by the thickness of the film, and may result in weak images. By using the change in birefringence, a higher optical density may be obtained due to larger differences in transmission corresponding to transmission or extinction in the polarizer used to measure the birefringence.

In another broad embodiment, the invention provides a film made of the infrared sensitive material discussed above. Preferably, such a film is thick enough to provide enough IR absorption to initiate a change in the index of refraction in the material, but also thin enough to avoid deterioration in image contrast due to thermal diffusion. If the film is too thick, then the image may be clouded by thermal diffusion "noise". As such, preferably the film is between about 0.1 and 20 microns thick. More preferably, the film is between about 5 and 15 microns thick.

Films made from materials of the invention are preferably polymerized and oriented by a Langmuir-Blodgett method. These films may include a plurality of commonly oriented monomolecular layers. The materials may also be oriented by application of an electric field and polymerized.

In another broad embodiment, the invention provides a method of forming a visible image from an infrared signal, which includes the steps of providing an infrared sensitive material which includes a polymeric semiconductor compound capable of absorbing the signal crosslinked with a spiropyran capable of producing a visible absorption band; and exposing said material to infrared radiation such that the material provides a variable birefringence and variable absorption in the visible as a function of the infrared radiation received by the material, thereby producing a visible image.

In another broad embodiment, the invention provides a system for producing a visible image from an infrared image projected from an infrared-emitting object, including an infrared sensitive film which includes a polymeric semiconductor compound having an infrared absorption band crosslinked with a spiropyran capable of producing a visible absorption band, said film adapted to receive the infrared image projected from the object; and an ellipsometric system for viewing the visible image produced on the film. The object may be part of a scene which includes a plurality of objects.

The materials, films, methods, and systems of the invention may be used to detect cancer, to detect faults in materials, or in night vision devices.

BRIEF DESCRIPTION OF THE DRAWINGS

FIG. 5 shows the photoisomerization of a spiropyran.

$(-C=O)$, a diene group

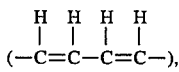
$(-C=C-C=C-)$, or any conjugated group.

Figure 7:
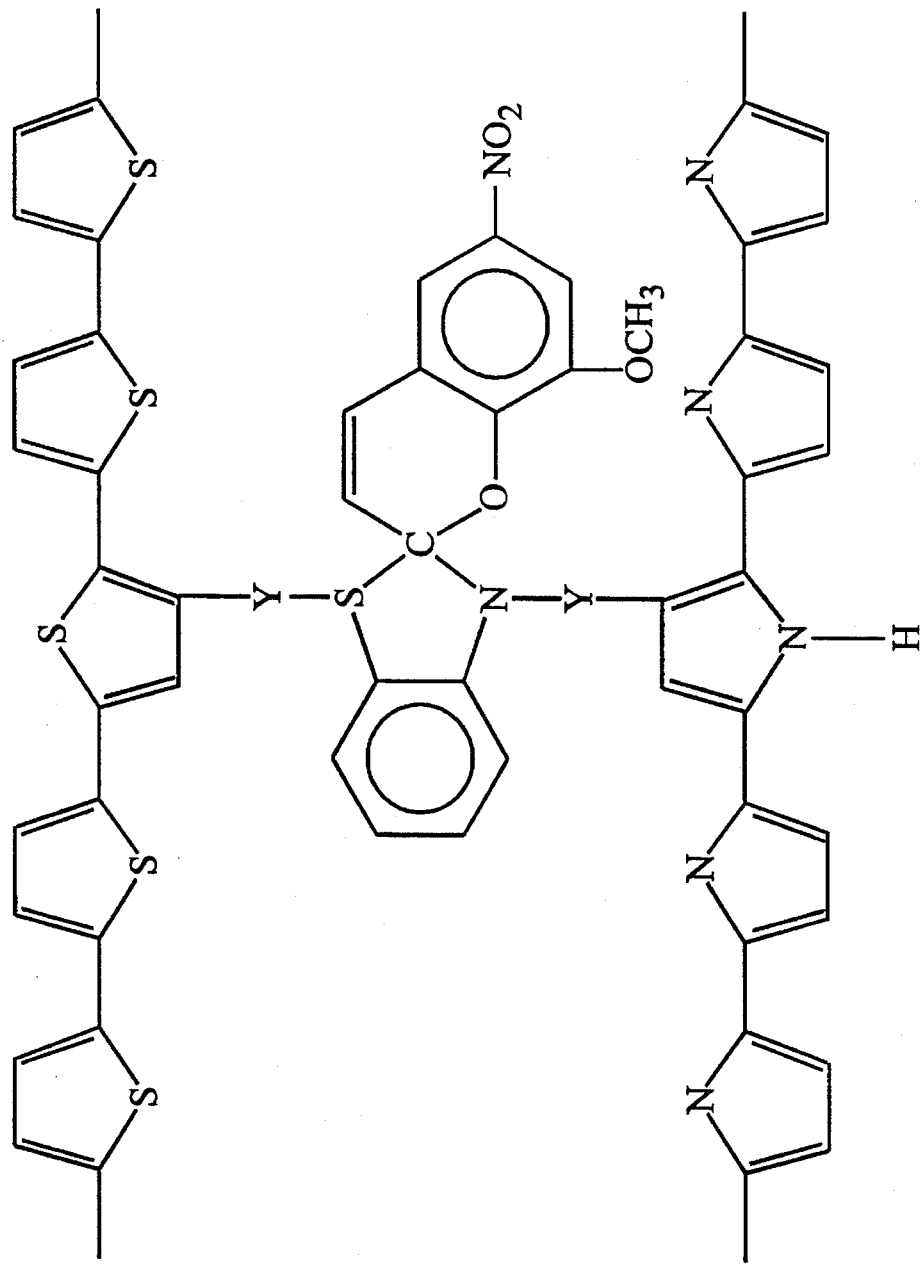

FIG. 7 shows a polythiophene crosslinked by a benzothiazoline spiropyran and Y.

Figure 8:
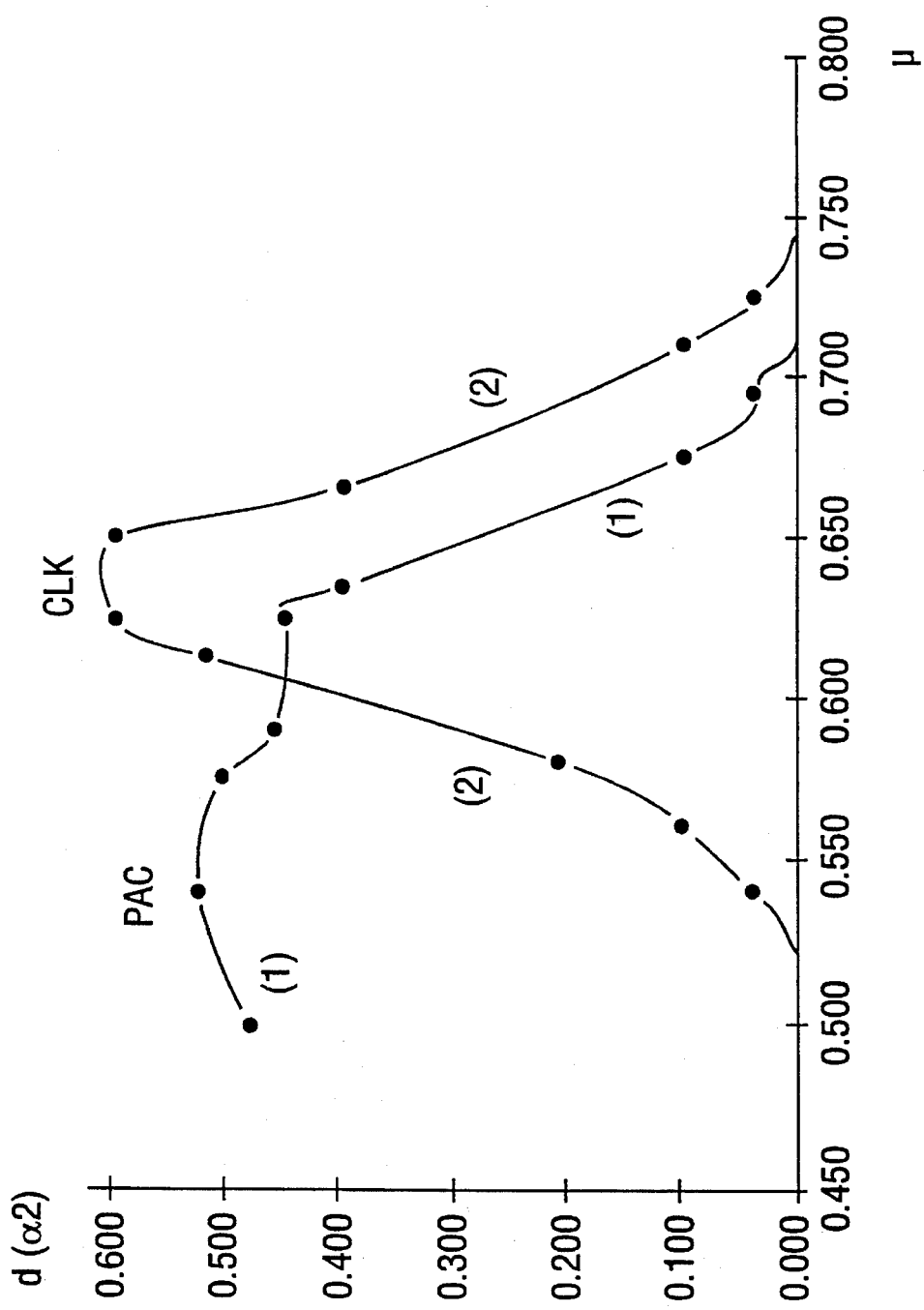

FIG. 8 is a plot showing the spectral characteristics of polydiacetylene and the merocyanine corresponding to an indoline spiropyran (i.e., the open form of the spiropyran).

FIG. 9 is a schematic drawing illustrating the preparation of an oriented film by the Langmuir-Blodgett technique.

Figure 10:
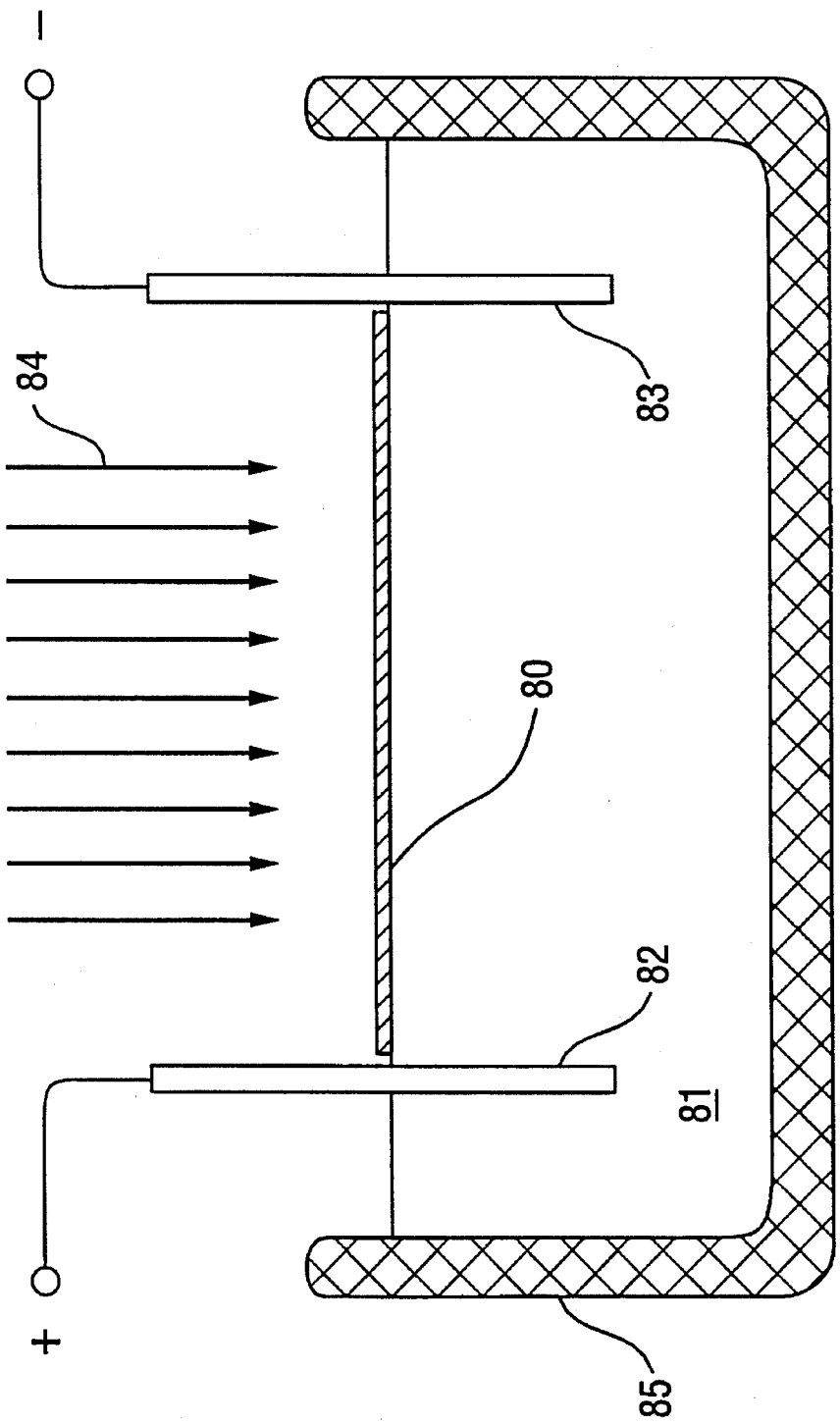

FIG. 10 is a schematic drawing illustrating the preparation of an oriented film by poling.

Figure 11:
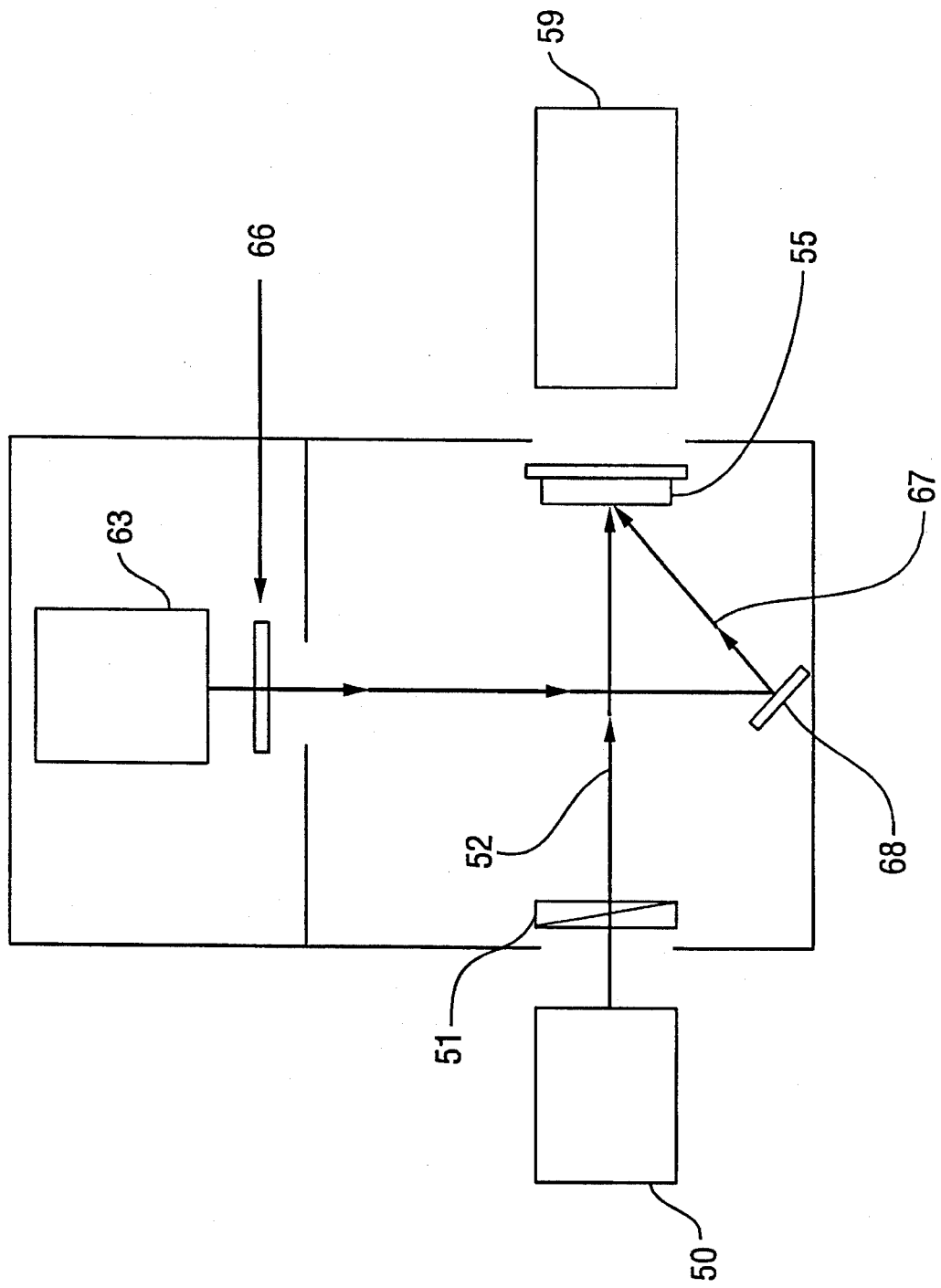

FIG. 11 is a system to measure changes in polarized light transmission as a function of IR irradiation on a film of the invention.

Figure 12:
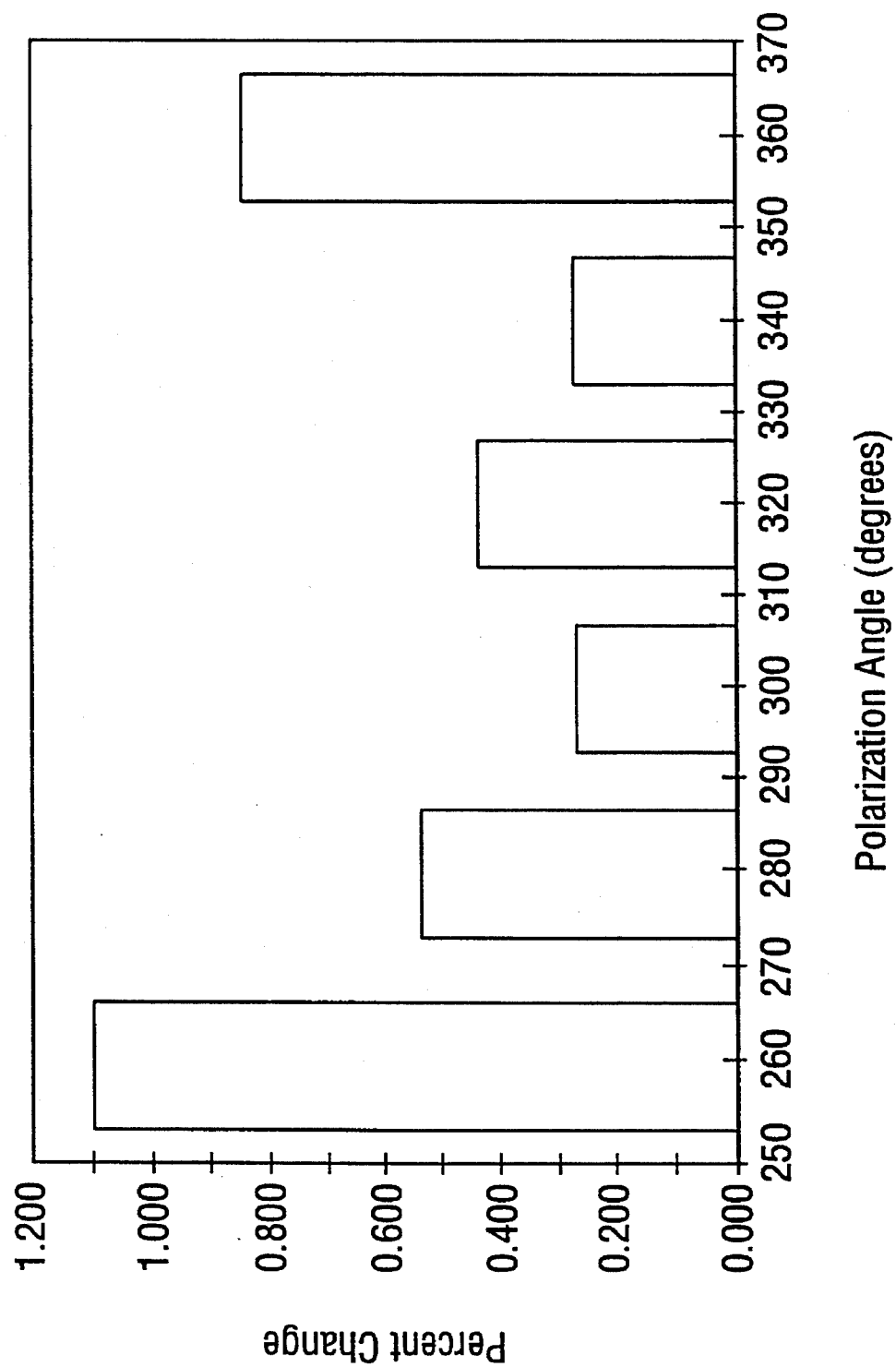

FIG. 12 depicts results of measurements performed with the system shown in FIG. 11 in terms of the variation in polarization as a function of IR irradiation intensity.

DETAILED DESCRIPTION OF PREFERRED EMBODIMENTS

Certain scientific theory and principles are discussed herein in connection with operation of this invention. However, such theory is presented for illustrative purposes only, and is not intended to be binding on the disclosure or claims presented herein.

An infrared system or camera using a material according to this invention may be characterized by its simplicity, compactness, high resolution and easy maintenance. At comparable performances, such a system or camera may be preferred in many respects to presently existing systems or cameras. U.S. Pat. No. 4,751,387 describes several such systems and/or cameras that may use the material of this invention.

It is theorized that the infrared imaging process according to this invention make use of the absorption and birefringence in the visible of certain spiropyrans capable of producing a visible absorption band crosslinked between polymer chains which absorb in the infrared. Conjugation between the polymer chains and the spiropyran provides vibrational coupling and charge transfer, which results in a modification of the absorption and birefringent properties of the spiropyran when the polymer chains absorb infrared energy. This modification is translated into a variation of transmission, reflection, and ellipticity of polarized light crossing the film or reflected upon it.

In practice, a film made of a material according to the invention may play the dual role of an infrared detection target and a display screen. To optimize this function, a small change in the refractive indices may correspond to a relatively large change in transmission or reflection of the film.

Birefringence is characterized by the modification of a plane polarized light transmitted or reflected by a birefringent material. The incident wave of amplitude a is decomposed into two waves, with amplitudes:

$$R_R = \frac{a}{2} e^{\frac{-2\pi a'}{\lambda} d}$$

and $$R_R = \frac{a}{2} e^{\frac{-2\pi a''}{\lambda} d}$$

where a' and a'' are the absorption coefficients of the material and d is its thickness.

The transmitted or reflected wave is therefore elliptical, due to the different values of a' and a''. The birefringence of the material can be quantified by the ellipticity of the transmitted (or reflected) light.

The ellipticity depends on the index of refraction and the thickness of the film. Small changes in these parameters will translate into changes in ellipticity. This dependency can be expressed by the amplitude of the two components $E_p$ and $E_S$ of the electric vector E of the transmitted or reflected light wave:

$$E_p = A_p \exp j (\omega t + \delta_p)$$

$$E_S = A_S \exp j (\omega t + \delta_S)$$

where $E_p$ is the component parallel to the plane of incidence of the wave;

$E_S$ is the component perpendicular to the plane of incidence;

$\delta_p$ is the phase of the wave in the plane of incidence; and $\delta_S$ is the phase of the wave in the plane perpendicular to the phase of incidence.

Both phase and amplitudes of the two components will be affected. These changes may be characterized by two parameters $\psi$ and $\Delta$ such that:

$$tg\psi \exp j\Delta = f(n_o, a_o, n, d)$$

where $n_o$ is the index of refraction;

$a_o$ is the angle of incidence;

d is the thickness of the film; and n is the index of refraction of the dichroic material.

The measurement of the ellipticity of the light transmitted or reflected by the birefringent film may be done by an analytical set consisting of a quarter wave plate and polarizer. The quarter wave plate converts the elliptically polarized light into two plane polarized lights that can be extinguished as the polarizer rotates, as represented in FIG. 2.

Figure 2:
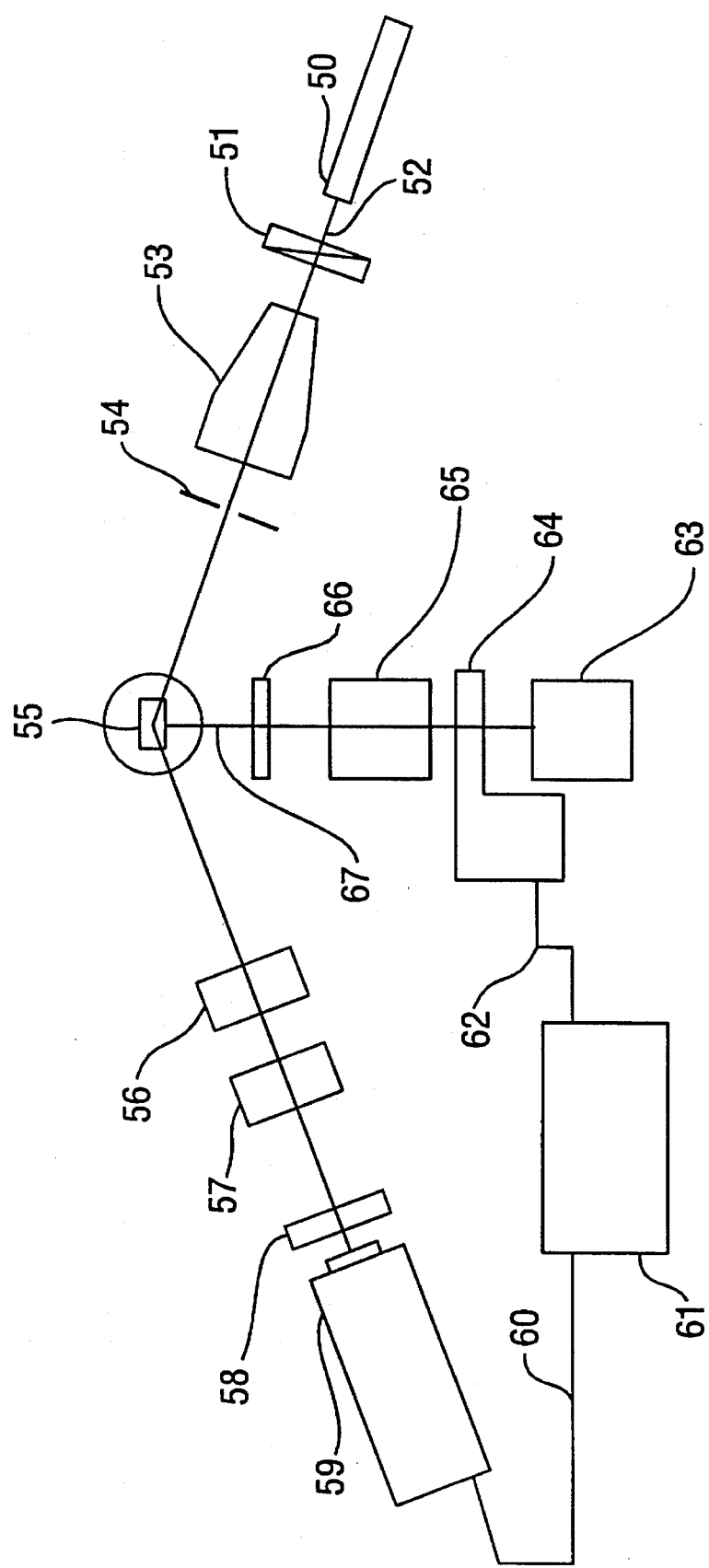
FIG. 2 is a schematic diagram of one system illustrating a method of testing the efficacy of the material of the invention.
Figure 3:
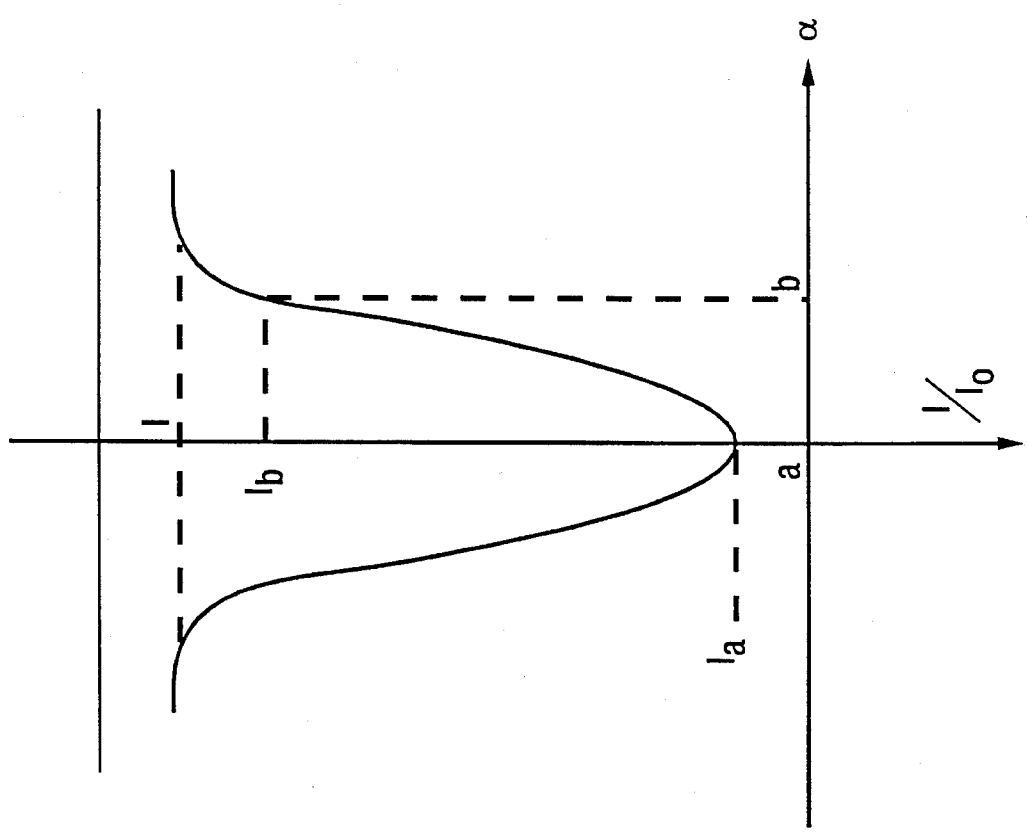
FIG. 3 is a plot representing the variation of amplitude which results from crossing of elliptical light through a quarter wave plate and polarizer as a function of the angle of the polarizer.

FIG. 2 represents a system used for the measurement of the variation of ellipticity of a sample of polymeric material as a function of infrared illumination on the surface. In FIG. 2 the beam 52 of a HeNe laser 50 is polarized in polarizer 51, expanded in beam expander 53 and reflected on the sample 52 at the Brewster Angle. The reflected beam 52 is then analyzed by a system quarter wave plate-analyzer (polarizer) 56 and 57, passed through a red filter 54, and measured by a photomultiplier 59. At the same time an infrared source (glowbar) 63 is illuminating the sample 55 with a 15 microwatt, 9.6 µm infrared bean 67 through a chopper 64, 118 meter, monochromator 65 and a bandpass filter 67. The signal 60 from the photomultiplier 59 is amplified by a 1.5 ±0.5 lock-in amplifier 61 synchronized via chopper reference signal 62 with the chopper 64.

In oriented polymeric materials, the absorption of light is strongly anisotropic. It can be shown that the strongest absorption takes place when the electric vector of the plane polarized light is parallel to the direction of the oscillators (atomic arrays) responsible for the interaction. This direction can be the direction of a conjugated chain in the polymer. When there is more than one plane of preferential absorption, there will be other orientation of the polarization of the transmitted light.

A common way to measure ellipticity is to depolarize the two components of the elliptical wave with a system quarter wave plate polarizer providing extinction for specific orientation of these elements. If the ellipticity varies at different points of the surface, the orientation for extinction will also vary or, if the elements are fixed, the intensity of light transmitted will vary, thereby providing a visible light pattern corresponding to the infrared image.

In order to increase the sensitivity of a material of the invention, one may optimize the electronic structure of molecules in the material. For example, the components of the material (e.g., the spiropyran and/or the polymeric semiconductor) may be selected in such a manner as to improve such electronic structure. Alternately, or in addition, conjugation between molecules in the material may be increased. Such optimization may be used to enhance the coupling between the molecular groups responsible for the birefringent properties of the spiropyran, and the polymer chains absorbing the IR.

Figure 4:
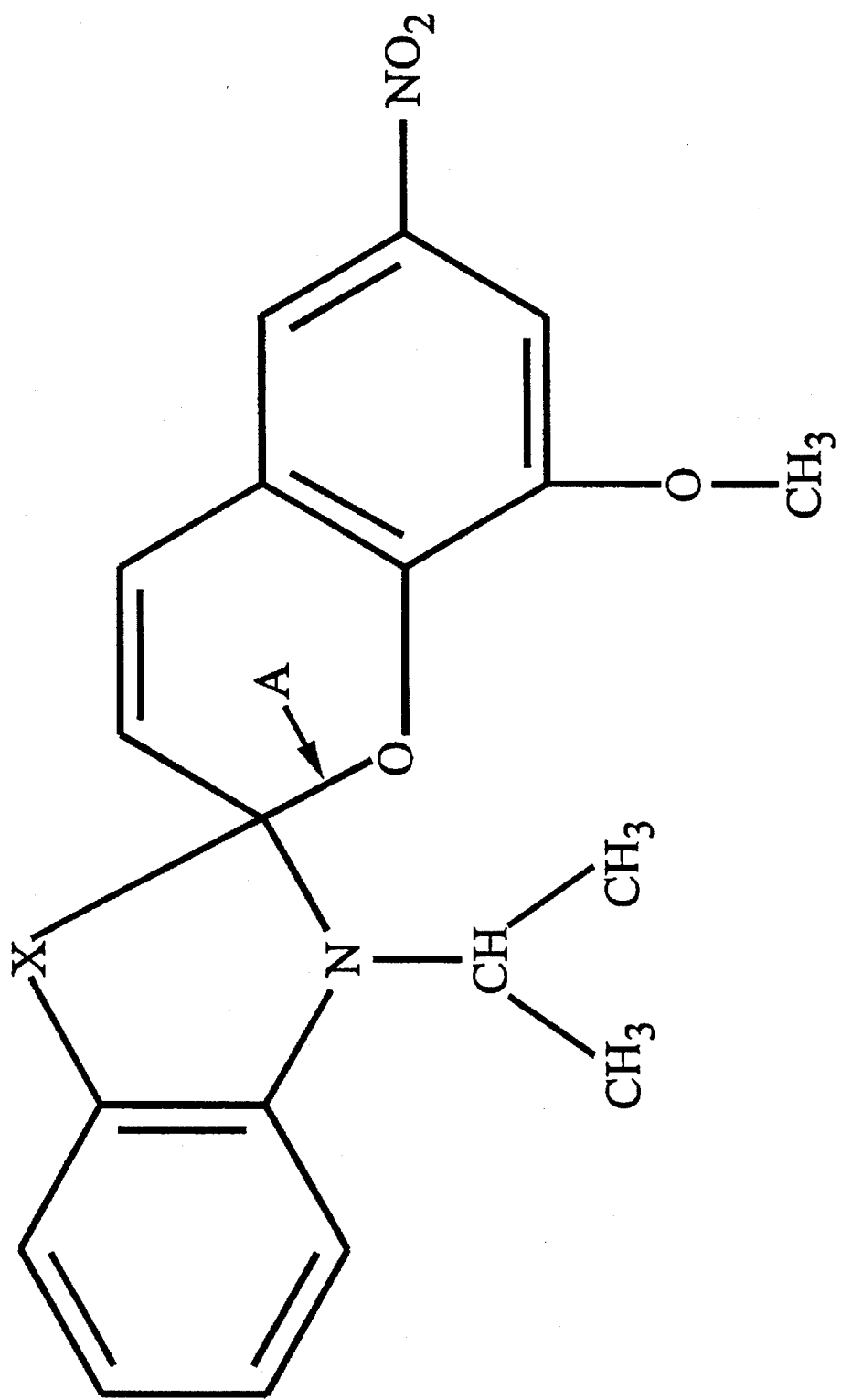
FIG. 4 shows a spiropyran.

The birefringence in molecular structures is produced by coupling forces between various substituents of the molecules. Birefringence has been explained using the coupled oscillators theory, considering single atoms or atomic groups as oscillators coupled within the structure of the molecule. These atomic groups are polarized in the presence of the electric vector of the light wave, and the resulting moment of the induced individual dipoles is generally not in phase with the electrical field E, thus creating a set of components $E_1$ and $E_2$ with a phase difference characteristic of an elliptical wave. The magnitude of this effect is a function of the density of the atoms or atomic groups constituting the molecules, as well as the coupling forces between them, the latter being related to the molecular bonds. If the atomic groups are distributed in a planar configuration, as is the case in many organic molecules, the interaction between the electric vector of any incident wave, and the coupled oscillators distributed in the plane of the molecule, will be optimum in that plane, and the light will be absorbed preferentially when the electric vector lies parallel to the plane. More specifically, strongest absorption will be observed when E is parallel to the direction of the atomic groups absorbing the light (i.e., the spiropyran). When the atomic groups are distributed in more than one plane, such as in certain heterocycles, each plane will produce its own set of components $E'_1$, $E'_2$ and $E''_1$, $E''_2$ with amplitudes and phase related to the density of atoms and coupling forces in both planes. Typical examples of such molecules with atomic groups distributed in more than one plane include the spiropyrans. An example of one such spiropyran is shown in FIG. 4, which shows a molecule wherein the left part of the molecule is contained in a plane perpendicular to that of the right part. In FIG. 4 the "X" term may represent, for example, $C(R)_2$ (e.g. $C(CH_3)_2$), O, Se, or S groups. In FIG. 4, the "A" represents the photodissociable bond in the molecule.

The ellipticity of the light reflected or transmitted by a birefringent material is therefore a function of the atomic distribution in its molecular structure and, more particularly, of the density and relative orientation of the chromophore groups in the molecules.

As a result of the coupled oscillator theory, chromophores with an absorption band $\lambda_1$ will affect the birefringence induced by another chromophore of absorption band $\lambda_2$, and vice versa. In other words, a change in ellipticity of light transmitted (or reflected) at the wavelength $\lambda_1$ will be observed when light is absorbed in the $\lambda_2$ band. The magnitude of the change in ellipticity at $\lambda_1$ is a function of the amplitude of the light absorbed in $\lambda_2$. If a molecule has a substituent chromophore absorbing in the visible and another substituent $\lambda_2$ absorbing in the infrared, the amplitude of infrared energy absorbed by the molecule can be measured by a change in ellipticity observed in the visible. This is a basis for the infrared imaging technique of the invention.

The sensitivity (or detectivity) of the material will depend on the oscillator strength characterizing the absorption for each chromophore, on their bandwidths, and on the coupling between the parts of the molecule containing each chromophore. The design of an optimum material for infrared detection or imaging may be based on these considerations.

The recent development of new organic semiconductors, as well as new techniques such as the Langmuir-Blodgett method to provide molecular orientation in thin films, has considerably improved the performance of birefringent materials. More specifically, the rigid structure of the molecule facilitates the coupling between the different elements for the design of a photobirefringent infrared detector.

Figure 1:
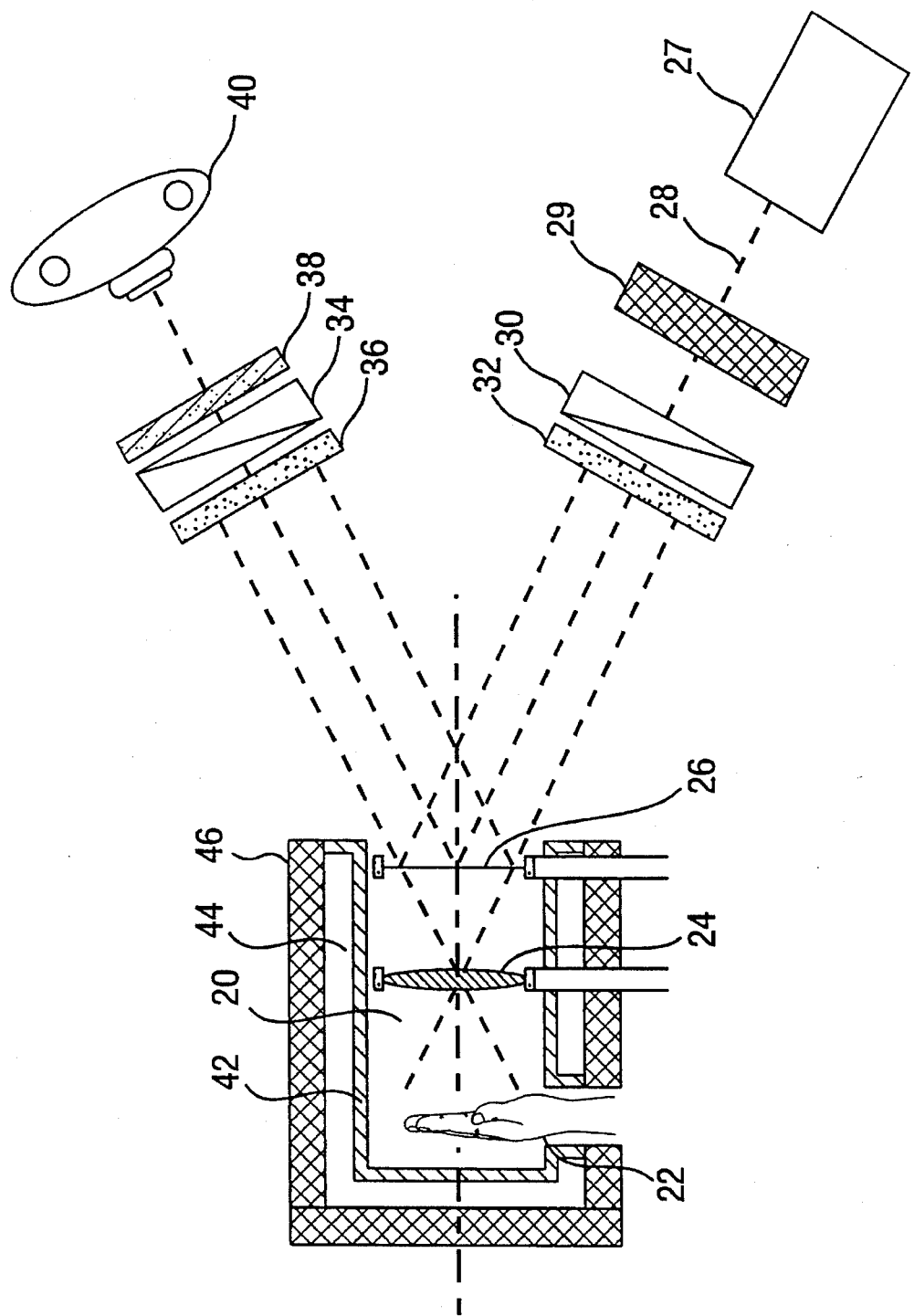
FIG. 1 is a schematic diagram of one system illustrating an embodiment of this invention.

A preferred embodiment of this invention is illustrated in FIG. 1. In this embodiment, a thermostatic chamber 20 receives an object source 22 (preferably emitting at 10 microns) and projecting its image through a germanium lens 24, onto a photobirefringent film 26. This process tends to modify the birefringent properties of the film 26 locally, according to the infrared flux projected onto it. A laser 27 may provide a laser beam 28 which is expanded in an expander 29 to cover the surface of the film 26. The light is elliptically polarized by passing through a polarizer 30 and λ/4 (quarter) wave plate 32, then reflected on the film 26 through a second polarizer 34 and λ/4 wave plate 36, and finally projected onto a frosted glass 38, where the image is observed visually or recorded by a camera 40.

The purpose of the thermostatic chamber 20 is to provide an isothermal background to the object 22, and to reduce "noise" due to local temperature gradients. The chamber 20 preferably comprises a black shield 42, backed by a layer of dry ice 44, further backed by a layer of thermal insulator 46. The entire chamber 20 preferably behaves as a blackbody source containing the emission of the object 22 superposed on a continuous background.

In practice, the polarizer 30 and λ/4 plate 32 are generally first oriented to provide an elliptically polarized light with maximum ellipticity. This light is then analyzed by a second polarizer 34 and λ/4 plate 36. Without any object in the chamber 20, the polarizer 34 is rotated with respect to the quarter wave plate 36 to provide one extinction. The object 22 is then introduced into the chamber 20 and a certain amount of light is allowed to be transmitted through the polarizer 34 and quarter wave plate 36, forming an image on the frosted glass. The light transmitted through the polarizer 34 and quarter wave plate 36 is proportional to the infrared flux on the film 26, and therefore creates a visible image on the frosted glass 38 corresponding to the infrared image projected onto the film 26.

Particularly preferred materials for use in this invention include polydiacetylenes and polythiophenes crosslinked with spiropyrans. One such preferred spiropyran includes indoline as shown in FIG. 4 wherein the X is a $C(CH_3)_2$, which may be used with HeNe light source. These materials tend to provide good sensitivity by conjugation between the different parts of the molecules.

It is expected that crosslinking of organic semiconductors (such as diacetylenes) with spiropyrans may lead to relatively high photobirefringent sensitivity, and provide an additional physical means to control the detection process.

Figure 6:
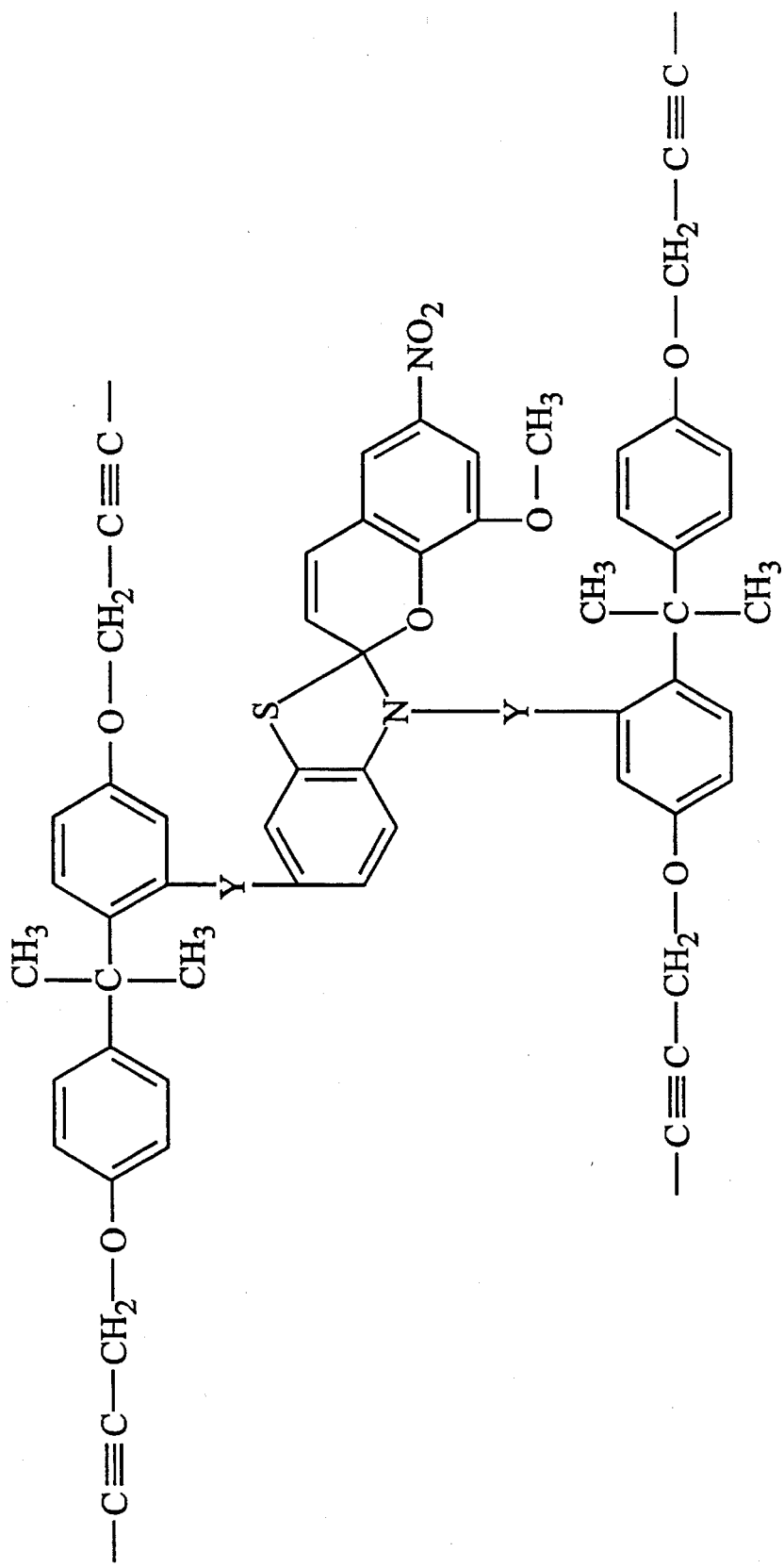
FIG. 6 shows a polydiacetylene crosslinked by a benzothiazoline spiropyran and Y. As used herein, Y may be a carbonyl group

Coupling between the infrared absorbing chain and the spiropyran in the crosslink can be adjusted by extending the links using conjugated groups such as diene or $C=O$ groups, as shown in FIGS. 6 and 7. Preferably, the material of the invention, when used in an infrared imaging process of the invention, directly converts the absorption of infrared energy by the material into a change of refractive index that modulates the transmission or reflection of light in a display configuration. In other words, a thin film containing the material of the invention preferably plays the dual role of an infrared detection target and a display screen.

A spiropyran molecule in its closed form generally does not absorb in the visible, and is therefore transparent. The change in color of a spiropyran, characteristic of ring opening, may be initiated by absorption of UV radiation, heat, or charge transfer into certain parts of the molecule. It is the latter which is used in this invention.

The ring opening of a spiropyran (see FIGS. 5A, 5B, and 5C), that is, the photodissociation of the C—O bond (bond A in FIG. 4), involves the redistribution of the electron density upon excitation of the $\pi$ electron system of the spiropyran and the weakening of the $C-O_\sigma$ bond. The orbited nature of the electronically excited state of the spiropyran can be strongly influenced by conjugation with other groups bonded to the spiropyran molecule. The $\pi$ electrons of a polydiene in the crosslink provide maximum conjugation. Other polyene type chains may be used to link with the spiropyran. The strong coupling between the orbitals responsible for covalent bonding and the electron delocalization facilitates strong coupling between phonons and carriers in the spiropyran chain.

The electron orbitals in the polydiene chain have a quantized range of values that increase as the bonding between adjacent atoms increases. The collection of $P_z$ orbitals (one from each of the two carbons in the bond) that interact in the chain direction overlaps to form the $\pi$ orbital. The remaining three electrons of carbon fit into $sp^3$ orbitals which form a bonds with adjacent carbons and the hydrogen. The transfer of charges along a chain containing periodic $\pi$ electrons distributions can be explained and quantified by a variety of methods. When such chains are terminated by a donor or acceptor group respectively, of the form:

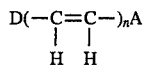

the polyene section is termed push pull, because of the ability to propagate local orbital delocalization (Soliton) as standing waves moving in one direction or the other of the chain, under the influence of periodic local field or charge transfer from the polydiacetylene chain acting as donor, and the spiropyran as acceptor. The charge transferred to the spiropyran may sufficiently modify and delocalize the electronic orbitals to weaken and eventually break the $C-O_\sigma$ bond. This breakage can be observed experimentally.

The polymer molecule (polydiacetylene or "PAC") shown in FIG. 6 absorbs in the visible (see curve (1) on FIG. 8). The two parts of the spiropyran molecule from each side of the central carbon atom are distributed in two planes perpendicular to each other in the non-activated state. As a result of charge transfer from the polydiacetylene to the spiropyran through the polyene link, the C—O bond on the right part of the molecule of FIG. 4 (i.e., bond A) is broken, and the two parts of the molecule rotate to become coplanar (see FIG. 5). As the right part opens, it extends to a conjugated form, with the creation of an absorption band in the visible, which is also responsible for the photobifringence.

In a preferred embodiment using polydiacetylene crosslinked with an indoline spiropyran (this spiropyran is abbreviated to "CLK" in FIG. 8), one can distinguish three basic elements, each one performing a specific function in the overall imaging mechanism:

(1) The polydiacetylene chains absorb in the infrared and, as a result, generate charge carriers while behaving as "donors";

(2) The polyene link transfers the charge to the spiropyran; and (3) The spiropyran acts as an acceptor of the charge.

To provide maximum freedom of the right part of the spiropyran and at the same time optimum extinction coefficient in the open form, the molecules of the polymer are preferably oriented and aligned parallel to each other, forming a two dimensional array. This orientation may be obtained by polymerizing the monomer under orientation in monomolecular layers by the method of Langmuir-Blodgett, and stacking these layers on top of each other.

In the Langmuir-Blodgett method, the monomer molecules are functionalized with hydrophilic and hydrophobic groups to provide orientation due to the preference of the hydrophilic group of the monomer to be in coordination with the water interphase of a Langmuir-Blodgett trough. The monomer may be spread on the surface of the water using an appropriate solvent, such as chloroform.

The polymerization may take place on the surface of the water. The polymerized film may be transferred from the surface of the water onto a glass substrate by dipping a substrate into the water and removing it under controlled speed. This operation is repeated as many times as there are monomolecular films to be added on the layer. A typical film is made of sixteen monomolecular layers.

FIGS. 9A, 9B, and 9C, and 9D illustrates the Langmuir-Blodgett film deposition technique for the preparation of a monomolecular film at an air-liquid interface and subsequent, layer-by-layer transfer of the film onto a substrate.

In FIG. 9A there is shown an amphoplilic material dissolved in a volatile solvent is deposited on the surface of the subphase (which is usually ultrapure water). If the compound is insoluble in water and nonvolatile, it is generally constrained to remain at the interface. The spreading solvent disperses the amphophilic molecules over the water surface and evaporates. The area available to the molecules 93 is reduced by movement of barriers 91, which are actuated by means of barrier motor 92, comparator 95 and electrobalance 94 in trough 96. As the available area per molecule decreases, the molecules are forced to orient themselves such that the hydrophobic portion is pointed away from the water and the hydrophilic portion is pointed towards the water. Thus a compact, two-dimensional monomolecular film with oriented molecules is formed. This film may be transferred to a substrate by inserting and withdrawing the latter through the interface.

FIG. 9B shows the adhesion of the film to a hydrophilic substrate as the latter is withdrawn through the air-water interface. FIG. 9B shows the adhesion of the film for the subsequent downstroke. Since the substrate is already coated with a monomolecular film with the hydrophobic tails pointing outward, the film on the water adheres to the substrate with the hydrophobic tails in contact. Repetition of this process leads to the fabrication of a multilayered film with head-to-head, tail-to-tail orientation as shown in FIG. 9C.

During the deposition process, the surface pressure of the film on the water may be measured by an electrobalance. By means of a feedback arrangement, the motion of the barrier may be controlled such that a constant surface pressure, and hence a constant molecular density, is maintained.

Orientation of the films may also be obtained by the poling method, which includes the steps of applying a strong electrostatic field on the surface of the water where the monomer composition has been spread. The polymerization may take place under UV illumination while the electric field is applied.

FIG. 10 illustrates a system for the electrostatic orientation of the polymer film 80 during the polymerization. The monomer solution is spread over the surface of water 81 in trough 85 between two electrodes 82 and 83, providing a high electric field during the polymerization which is activated by ultraviolet light 84.

The same mechanism may be applicable to other polymer structures involving semiconductors, such as polythiophenes. Polythiophenes are believed to offer a number of advantages over polydiacetylenes, especially faster response times. Similar mechanisms have been used successfully for the design of infrared image and fiber optics gas sensors.

EXAMPLES

1. Sensitivity to 9.6 µm

A preliminary evaluation of the effect of absorption at 9.6 µm irradiation on a films's transmission and reflection of polarized light at 604.4 nm is shown in FIG. 11. In FIG. 11, the sample box of a Heath ¼ meter monochromatic system was modified so that a birefringent film in the test position could be irradiated with 15 µW of radiation in a 2 µm band centered at 9.6 µm. A material made of crosslinked spiropyran (i.e., the spiropyran of FIG. 4 wherein X was $C(CH_3)_2$) diacetylene chain polymer was deposited by the Langmuir-Blodgett method on a ¾ inch diameter, ½ inch thick glass substrate to form a film of about 2 micron thickness (the crosslinking and polymerization of the material was achieved by spreading a mixture of diacetylene monomer with the substituted spiropyran dissolved in chloroform on the surface of water in a Langmuir-Blodgett trough, and exposing to UV radiation at 2.6 nanometer for about one second). A shutter (not shown in FIG. 11) was placed in the 15 µW/cm², 9.2 µm IR beam 67 between the isolation filter 66 and the IR Source 63 with mirror 68 directing the beam 67 toward sample 55, wherein visible light source 50 directs a beam 52 toward sample 55 with photomultiplier 59 receiving the light reflected from sample 55. Measurements of the transmission of the polarized 604.4 radiation were made for various angular orientations of the film, 10° intervals, alternately with no 9.6 µm radiation, and 15 µW of such radiation for each angle. The results of these measurements are shown in FIG. 12. As shown in FIG. 12, the transmission of polarized 604.4 nm light changed by up to 1% with the irradiation of the film with 9.6 µm unpolarized light.

The data shown in FIG. 12 suggests that this change is not caused by thermal effects. The irradiation of the beam constituted an increase in ambient radiation at 10 µm equivalent to a temperature change of less than 0.4° Kelvin. Assuming a 0.1 emissivity for the film, radiative equilibrium would be established after an increase in temperature of less than 0.1° Kelvin. No such direct thermal effect was observed in the experiments performed.

The preceding measurement demonstrated a birefringent effect that varied with the light polarization angle, which suggested an elliptical light reflection measurement. As such, a similar film was placed on a rotation stage in the optical system shown in FIG. 2. Elliptically polarized HeNe laser light 52 was reflected off the surface of the film at an incidence angle of 70°. The reflected light was passed through a λ/4 plate 56 and an analyzer 57 in front of a red-filtered 58 photomultiplier 59. The film was subjected to optically chopped 9.6 µm radiation 67 at normal incidence to the film. Both beams were stepped down to approximately 1 cm diameter. The IR beam 67 was chopped at 44 Hz and 88 Hz. The photomultiplier 59 and the chopper reference signal 62 were fed to a Lock-In-Amplifier 61.

The analyzer 57 and π/4 plate 56 in the reflected beam were adjusted to a null signal from the photomultiplier 59 when no IR radiation was present. In other words, the optical beam entering the polarizer 51 was plane polarized perpendicular to the analyzer's direction. When the film was irradiated with the chopped IR beam, one mode of the reflected elliptically polarized light changed due to the corresponding change in the reflectivity (birefringence) of the film. As a consequence the beam exciting the π/4 plate was no longer perpendicular to the analyzer during IR irradiation. The lock-in-amplifier 61 measured an alternating photomultiplier signal of 1.5±0.5 MV in phase with the chopped signal 68. No change in output was observed for either chopping rate.

An evaluation of possible thermal effects for this latter experiment demonstrate that the effect is not thermal. The material made of crosslinked spiropyran diacetylene chain polymer was deposited on a ¾ inch diameter, ½ inch thick glass substrate. Considering the thermal mass involved, and the period of the IR illumination, chopping rate leads to an upper limit on possible temperature changes of 0.05 K. A more probable value is on the order of 0.01° Kelvin.

2. Imaging at 10 Microns

Preliminary tests on imaging used a setup represented in FIG. 1. The object, a hand, was introduced into a thermostatic chamber maintained at dry ice temperature. The infrared image of the hand was projected onto the birefringent film through a germanium lens. A focal plane chopper (not represented) was later introduced into the system allowing chopping of the signal up to 400 Hz. An expended laser beam was directed onto the film at an angle of 70° to the axis of the system. The beam was elliptically polarized with a polarizer and quarter wave plate set. The reflected light (at 70° to the normal) was then analyzed with an identical quarter wave plate and polarizer set. The visible image transmitted through the analyzer could be viewed on a frosted glass and photographed with a camera. The polarizer 2 and the quarter wave plate were oriented to obtain extinction in the absence of the object (dry ice background). When the hand was introduced into the isothermal chamber the variations of ellipticity produced in the film caused the analyzer to depart from the extinction position, thereby allowing light to go through in an amount proportionate to the variation of ellipticity or the intensity of the infrared image. As a result, a blurred image of the hand was observed on the frosted glass.

The quality of the image was improved by proper adjustment of the chopping frequency and good contrast was obtained during a relatively short time. It is during that short time that a photograph should be taken which explains the necessity to take a great number of photographs to obtain a few good ones. The experimental configuration suffered from great instability due to thermal variations in the optical path and in the vicinity of the film. It is expected that considerable improvement may be obtained by using a vacuum cell and feedback into an optoelectronically controlled analyzer.

The above examples show that it is possible to use charge transfer to visualize an infrared image using oriented Langmuir-Blodgett films of an infrared absorbing polymer crosslinked by a spiropyran. A system was constructed in which an infrared emitting object projected onto the birefringent film was viewed by an ellipsometric method. The use of ellipsometry in an imaging method conveyed high sensitivity to the system.

This invention has been disclosed in connection with specific embodiments. However, it will be apparent to those skilled in the art that variations from the illustrated embodiments may be undertaken without departing from the spirit and scope of this invention.

What is claimed is:

1. An infrared sensitive material comprising a polymeric semiconductor compound having an infrared absorption band crosslinked with a spiropyran capable of producing a visible absorption band, wherein the material is adapted to produce a visible image when exposed to infrared radiation during use.

2. The infrared sensitive material of claim 1 wherein the semiconductor compound, when exposed to infrared radiation, is adapted to transfer charges to the spiropyran during use, thereby producing the visible image by changing the absorption and birefringence of the material during use.

3. The infrared sensitive material of claim 2 wherein the semiconductor compound, when exposed to infrared radiation, is adapted to generate the charges transferred to the spiropyran during use.

4. The infrared sensitive material of claim 1 wherein the semiconductor compound, when exposed to infrared radiation, is adapted to transfer charges to the spiropyran to produce a ring opening in the spiropyran during use, thereby generating a visible absorption band in the material during use.

5. A film comprising the infrared sensitive material of claim 1.

6. A film comprising the infrared sensitive material of claim 1 wherein the film is between about 0.1 and 20 microns thick.

7. A film comprising the infrared sensitive material of claim 1 wherein the film is between about 5 and 15 microns thick.

8. The infrared sensitive material of claim 1 wherein the polymeric semiconductor compound comprises a polydiacetylene.

9. An infrared sensitive material comprising a polymeric semiconductor compound having an infrared absorption band crosslinked with a spiropyran capable of producing a visible absorption band, wherein the material is adapted to produce a visible image when exposed to infrared radiation during use, and wherein the polymeric semiconductor compound comprises a polythiophene.

10. An infrared sensitive material comprising a polymeric semiconductor compound having an infrared absorption band crosslinked with a spiropyran capable of producing a visible absorption band, wherein the material is adapted to produce a visible image when exposed to infrared radiation during use, and wherein the polymeric semiconductor compound comprises a polyvinylcarbazole.

11. An infrared sensitive material comprising a polymeric semiconductor compound having an infrared absorption band crosslinked with a spiropyran capable of producing a visible absorption band, wherein the material is adapted to produce a visible image when exposed to infrared radiation during use, and wherein the polymeric semiconductor compound comprises a polypyrrole.

12. An infrared sensitive material comprising a polymeric semiconductor compound having an infrared absorption band crosslinked with a spiropyran capable of producing a visible absorption band, wherein the material is adapted to produce a visible image when exposed to infrared radiation during use, and wherein the material is polymerized and oriented by a Langmuir-Blodgett method.

13. An infrared sensitive material comprising a polymeric semiconductor compound having an infrared absorption band crosslinked with a spiropyran capable of producing a visible absorption band, wherein the material is adapted to produce a visible image when exposed to infrared radiation during use, which comprises a plurality of commonly oriented monomolecular layers.

14. An infrared sensitive material comprising a polymeric semiconductor compound having an infrared absorption band crosslinked with a spiropyran capable of producing a visible absorption band, wherein the material is adapted to produce a visible image when exposed to infrared radiation during use and wherein the material is oriented by application of an electric field and polymerized.

* * * * *